(12) United States Patent
Kim

(10) Patent No.: US 6,323,920 B1
(45) Date of Patent: Nov. 27, 2001

(54) METHODS OF MAKING LCD DEVICES HAVING COLOR FILTER

(75) Inventor: Sang-Sik Kim, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/506,996

(22) Filed: Feb. 18, 2000

Related U.S. Application Data

(62) Division of application No. 08/772,487, filed on Dec. 23, 1996, now Pat. No. 6,078,372.

(30) Foreign Application Priority Data

Dec. 22, 1995 (KR) .................................................. 95-55029

(51) Int. Cl.[7] ...................... G02F 1/1335; G02F 1/1333; G03C 9/00
(52) U.S. Cl. ............................ 349/106; 349/95; 349/110; 430/7
(58) Field of Search .............................. 349/106, 95, 187, 349/110; 430/7

(56) References Cited

U.S. PATENT DOCUMENTS

| | | | |
|---|---|---|---|
| 4,790,632 | * | 12/1988 | Miyakawa et al. ..................... 349/95 |
| 4,807,978 | * | 2/1989 | Grinberg et al. ....................... 349/95 |
| 5,101,279 | * | 3/1992 | Kurematsu et al. .................... 349/95 |
| 5,187,599 | * | 2/1993 | Nakanishi et al. ..................... 349/95 |
| 5,398,125 | * | 3/1995 | Willet et al. ............................ 349/95 |
| 5,412,506 | * | 5/1995 | Felblum et al. ...................... 359/569 |
| 5,508,834 | * | 4/1996 | Yamada et al. ...................... 349/110 |
| 5,666,226 | * | 9/1997 | Ezza et al. ........................... 359/621 |
| 5,739,548 | * | 4/1998 | Shigeta et al. ......................... 349/95 |

* cited by examiner

*Primary Examiner*—William L. Sikes
*Assistant Examiner*—Toan Ton
(74) *Attorney, Agent, or Firm*—Myers Bigel Sibley & Sajovec

(57) ABSTRACT

Color filters for liquid crystal display (LCD) devices include a transparent substrate with a light shielding layer on the front surface thereof. The light shielding layer includes an array of apertures therein. A color filter layer is on the light shielding layer and extends across the apertures. A lens layer is located on the rear surface opposite the light shielding layer. The lens layer extends on the rear surface at least partially to opposite the apertures in the array of apertures. The lens layer may be formed by exposing a photoresist layer at the same time the color filters are patterned, so that the lens layer is self-aligned to the apertures in the shielding layer.

7 Claims, 4 Drawing Sheets

METHODS OF MAKING LCD DEVICES HAVING COLOR FILTER

This application is a division of Ser. No. 08/772,487 filed Dec. 23, 1996 now U.S. Pat. No. 6,078,372.

FIELD OF THE INVENTION

This invention relates to liquid crystal display (LCD) devices and fabrication methods therefor, and more particularly to color filters for LCD devices and fabrication methods therefor.

BACKGROUND OF THE INVENTION

Liquid crystal display (LCD) devices are widely used for flat panel displays of images. As is well known to those having skill in the art, an LCD device generally includes a thin film transistor panel and a color filter panel which are spaced apart from one another. The thin film transistor panel generally includes a first substrate and a plurality of thin film transistors which are formed on the surface thereof. The color filter panel generally includes a second substrate and a color filter layer formed on a surface thereof. As is well known to those having skill in the art, it is generally desirable for LCD devices to have a high aperture ratio, to thereby improve the resolution thereof. The aperture ratio is the area through which a light beam is transmitted through the panel.

FIG. 1 is a cross-sectional view of a conventional color filter for an LCD device. As shown in FIG. 1, color filter 5 includes a light shielding layer 2 on a transparent substrate 1, such as glass. The light shielding layer includes an array of apertures therein. The light shielding layer 2 forms a black matrix for the color filter.

A color filter layer including red, green and blue color filters 3-1, 3-2 and 3-3 respectively, is formed on the light shielding layer 2 and spans the apertures therein. The color filters may be formed by depositing color dyes on the light shielding layer 2. Each color filter 3-1, 3-2 and 3-3 is formed between two adjacent light shielding portions and on the ends of the two adjacent light shielding portions. A protective layer 4 is formed on the light shielding layer 2 and the color filter layer.

A color filter according to FIG. 1 may be fabricated by forming an opaque layer, such as chromium, chromium oxide or organic material on a glass substrate 1 and then pattern in the opaque layer to form the light shielding layer 2. Color dyes of red, green and blue are then sequentially deposited and patterned to form the color filters 3-1, 3-2 and 3-3 respectively. Finally, a protective layer 4 is deposited over the color filters and the light shielding layer, to protect the color filter layer and to provide a smooth outer surface for the color filter.

In a conventional LCD device as described above, the aperture ratio is generally dependent upon the area through which a light beam from a back light on the thin film transistor panel is transmitted. In order to improve the resolution of the display, higher aperture ratios are generally desirable.

However, as shown in FIG. 1, a light beam 6 which is transmitted from the back light on the thin film transistor panel, will only penetrate the portion A of the color filter layer, but will not penetrate the portion A', due to the light shielding layer 2. Accordingly, the aperture ratio in a conventional LCD device may be reduced and it may become difficult to increase the resolution thereof.

In order to increase the aperture ratio, it may be desirable to form larger apertures in the light shielding layer 2. However, if the apertures in the light shielding layer are enlarged, it may be difficult to align the color filters 3-1, 3-2 and 3-3 to the apertures in the light shielding layer 2. Moreover, planarity problems may be produced.

SUMMARY OF THE INVENTION

It is therefore an object of the present invention to provide improved color filters for liquid crystal display (LCD) devices and methods of fabricating the same.

It is another object of the present invention to provide LCD device color filters which can have high aperture ratios without requiring larger apertures in the light shielding layers thereof.

It is another object of the present invention to provide methods of fabricating color filters for LCD devices which do not require highly precise alignment between color filter layers and light shielding layers thereof.

These and other objects are provided, according to the present invention, by color filters for LCD devices and fabrication methods therefor which include a concave lens layer in the color filter. The concave lens layer, which may be formed from reflowed photoresist, can increase the aperture ratio without requiring reduction in the size of the apertures of the light shielding layer. Thus, high aperture ratio LCD devices can be provided without requiring ultra-high resolution color filters.

In particular, color filters for LCDs according to the invention include a transparent substrate, and a light shielding layer on the transparent substrate. The light shielding layer includes an array of apertures therein. The color filter layer spans the apertures. The color filter also includes means for dispersing light which passes through the color filter layer.

Preferably, the transparent substrate includes front and rear surfaces. The light shielding layer and the color filter are on the front surface, and the dispersing means is on the rear surface. The color filter layer is preferably on the light shielding layer, opposite the transparent substrate, and extends into and across the apertures. The color filter layer more preferably fills the apertures.

The dispersing means is preferably a lens layer, on the rear surface of the substrate. The lens layer is located opposite the light shielding layer and extends at least partially to opposite the apertures in the light shielding layer. The lens layer is preferably a concave lens layer formed of photoresist. The lens layer can increase the aperture ratio without requiring an increase in the size of the apertures in the light shielding layer.

Color filters for LCDs according to the present invention may be fabricated using self-aligned methods. In particular, a light shielding layer, including an array of first apertures therein, is formed on the front face of a transparent substrate. A light dispersing layer is formed on the rear face of the transparent substrate. The light dispersing layer is preferably reflowable photoresist.

The light dispersing layer is patterned through the transparent substrate using the light shielding layer as a mask, to form a patterned light dispersing layer having several apertures opposite the first apertures in the light shielding layer. The patterned light dispersing layer is flowed to form a lens layer opposite the light shielding layer which extends on the rear surface at least partially to opposite the array of first apertures. A color filter layer is formed on the light shielding layer, spanning the first apertures therein. Since methods according to the present invention can form color filters having high aperture ratios without requiring precise alignment of the light shielding layer and a color filter layer, high resolution LCD devices can be formed, having a wide viewing angle.

DETAILED DESCRIPTION OF PREFERRED EMBODIMENTS

Figure 1:
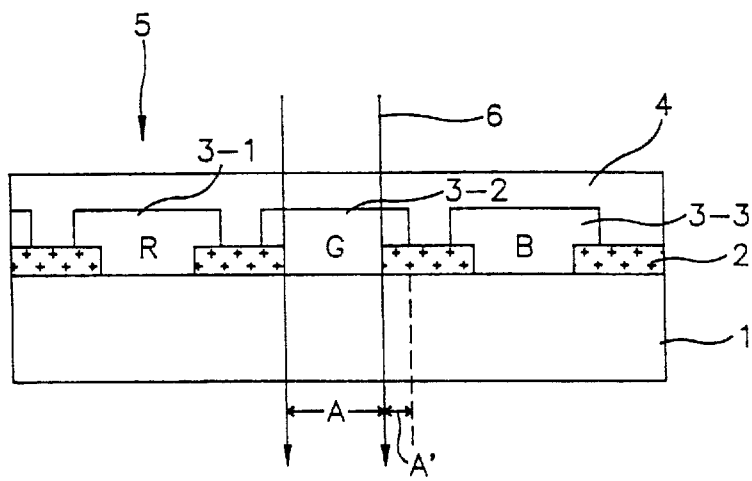
FIG. 1 is a cross-sectional view of a conventional color filter for an LCD device.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 2:
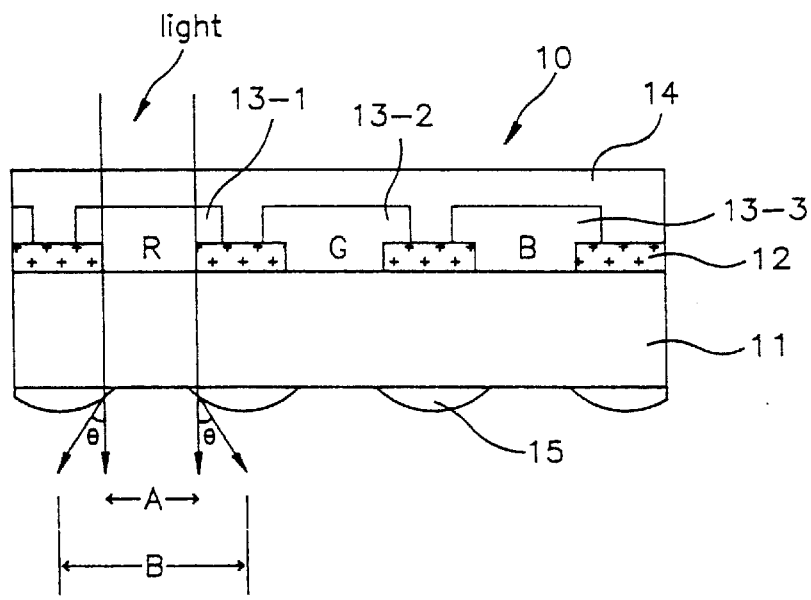
FIG. 2 is a cross-sectional view of LCD device filters according to an embodiment of the present invention.

FIG. 2 is cross-sectional view of an embodiment of color filters for liquid crystal display (LCD) devices according to the invention. As shown, the color filters include a color filter layer which is formed on the front surface of a transparent (preferably glass) substrate 11. The color filter layer includes red, green and blue filters 13-1, 13-2 and 13-3 respectively, which are formed in an array of apertures in a light shielding layer 12.

According to the invention, light dispersing means, such as a lens layer 15 is also included. As shown in FIG. 2, lens layer 15 is a concave lens layer which is preferably formed on the rear surface of substrate 11. As shown in FIG. 2, lens layer 15 disperses an incident light beam which passes through the color filter layer. As will be described below, the lens layer 15 is preferably formed of reflowed photoresist.

Still referring to FIG. 2, the light shielding layer 12 is preferably formed of chromium, chromium oxide, or organic materials and functions as a black matrix, as is well known to those having skill in the art. The color filter layer may be formed of color dyes. A protective layer 14 may be formed on the color filter layer and the shielding layer to protect the color filter layer and to provide a smooth outer surface.

As also shown in FIG. 2, the lens layer 15 is preferably located opposite the light shielding layer 12. The lens layer also extends at least partially to opposite the apertures in the array of apertures of light shielding layer 12. Thus, the light beam from a back light is dispersed and transmitted by the lens layer 15. Since LCD devices according to the present invention include concave lens 15 at the rear surface of the transparent substrate, it can have wide visual angles θ. As a result, the LCD device has a high aperture ratio B compared with the aperture ratio A of a conventional LCD device.

Figure 3A:
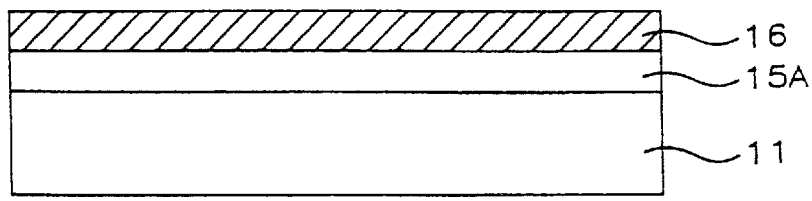
FIGS. 3A–3H are cross-sectional views of the LCD color filters of FIG. 2 during intermediate fabrication steps.

Referring now to FIGS. 3A–3H, methods of fabricating color filters for LCD devices according to the invention will now be described. As shown in FIG. 3A, a dispersing layer 15A for dispersing a light beam is formed on the rear surface of a transparent (glass) substrate 11. The dispersing layer 15A is preferably a photoresist layer. Then, an inorganic layer 16 is deposited on the photoresist layer 15A. The inorganic layer may be chromium or tungsten silicide. The inorganic layer may be provided to reduce the light reflection due to the nonuniformity of the substrate after the exposure process which forms the color filters. The organic layer 16 also can enhance the exposure of the photoresist layer because of the high reflectivity thereof.

Figure 3B:
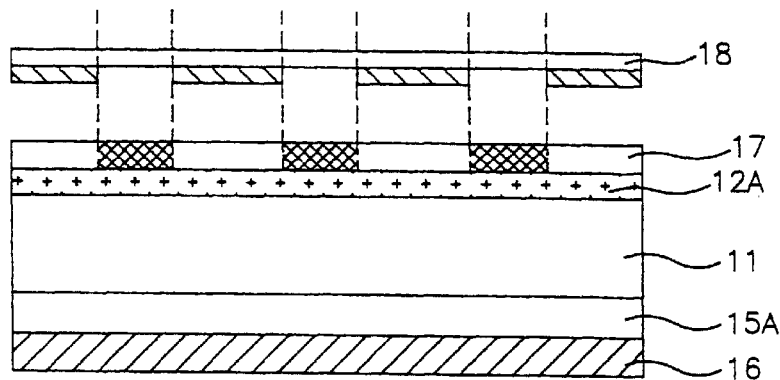
Figure 3C:
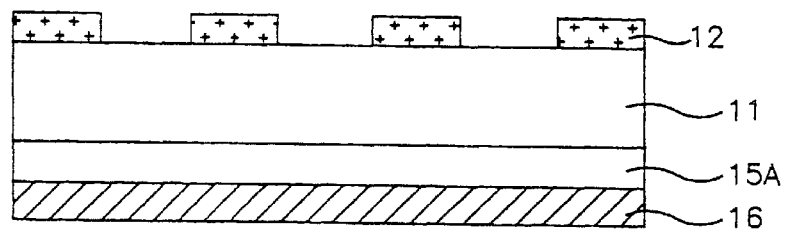

Referring now to FIG. 3B, a light shielding layer 12A, such as chromium or other opaque materials is deposited at a thickness of about 1000 Å. A photoresist layer 17 is deposited on the light shielding layer 12A and is patterned using mask 18 to define light shielding regions. Wet or dry etching is then performed using the patterned photoresist layer 17 as a mask, to selectively remove chromium layer 12A and thereby form a light shielding layer 12 having an array of first apertures therein on the front surface of the substrate 11 as shown in FIG. 3C. The light shielding layer functions as a black matrix for the color filter. It will be understood that rather than chromium, a black dye, chromium oxide, organic layers or other conventional layers may be used to form the light shielding layer 12.

Figure 3D:
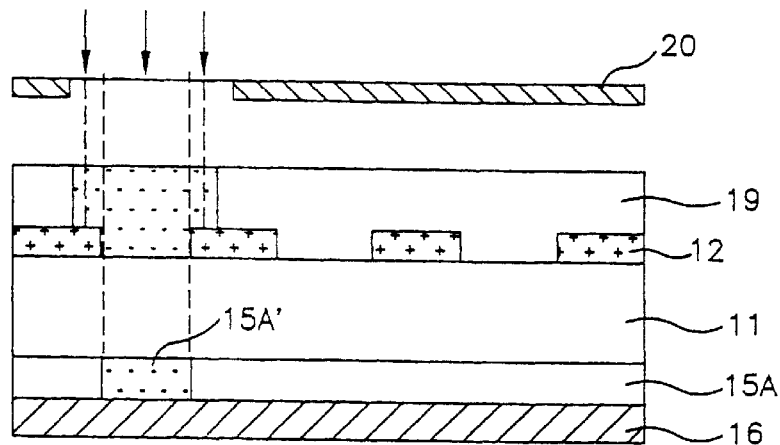
Figure 3E:
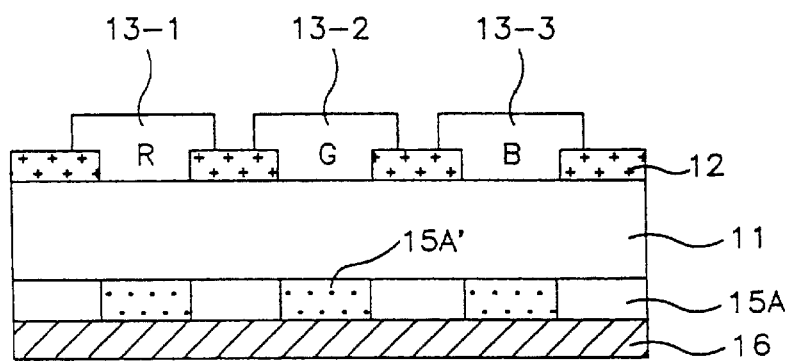

Referring now to FIG. 3D, a red dye layer 19 is deposited on the substrate and exposed and developed using color filter forming mask 20. As shown in FIG. 3E, the red color filter 13-1 is formed between two adjacent light shielding portions of the light shielding layer using a color dying method, a color dispersing method or other conventional methods.

Referring again to FIG. 3D, during the formation of red color filter 13-1, the light beam is also transmitted through the substrate 11 to the photoresist layer 15A, to thereby expose region 15A' of the photoresist layer. The steps of FIG. 3D are also performed using green and blue dye layers and corresponding masks, to thereby form the green and blue filters 13-2 and 13-3, as shown in FIG. 3E. Formation of these filters will also expose portions 15A' of the photoresist layer 15A.

Figure 3F:
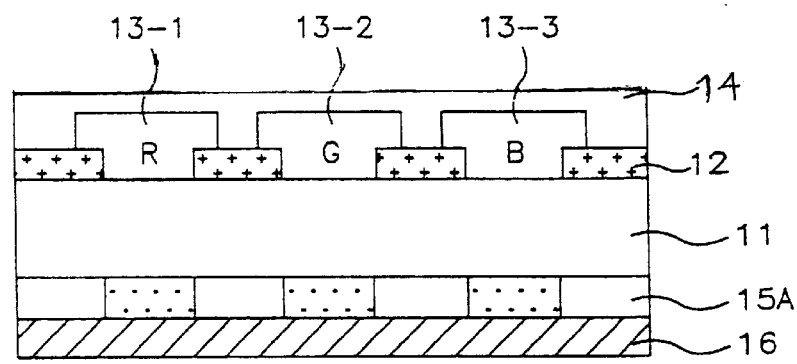
Figure 3G:
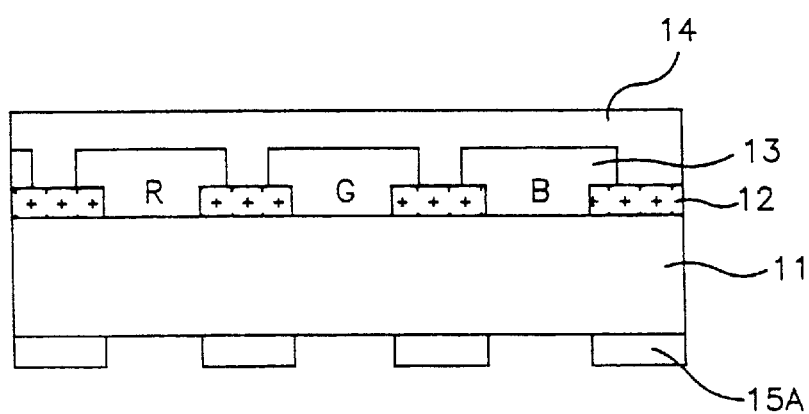

Referring now to FIG. 3F, after formation of the color filters, a protective layer 14 is deposited on the substrate to cover the color filters 13-1, 13-2 and 13-3, and the light shielding layer 12. The organic layer 16 on the rear surface of substrate 11 may then be removed by etching. The exposed regions 15A' of the photoresist layer 15A are then removed by developing, as shown in FIG. 3G, so that the photoresist layer remains at those regions where the light beam was not transmitted during the exposure process of forming a color filter layer 13. In other words, photoresist layer 15A remains opposite the light shielding layer 12, and includes an array of second apertures opposite the array of first apertures.

Figure 3H:
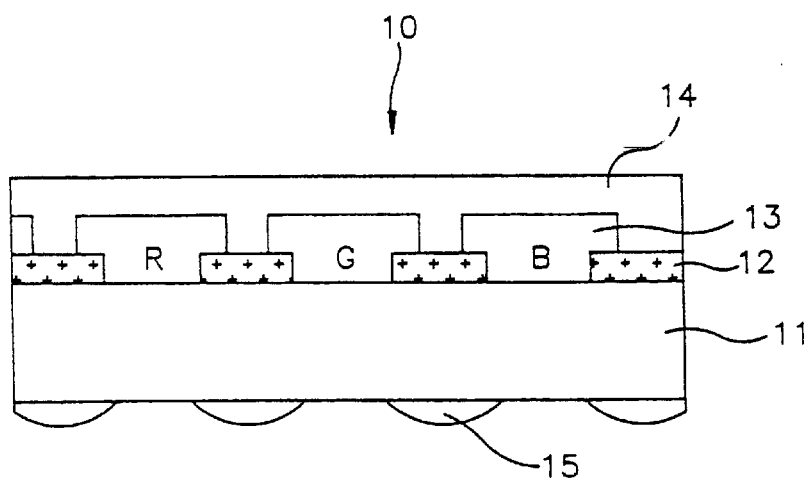

Finally, referring to FIG. 3H, the photoresist layer 15A is reflowed by a thermal reflow process, to transform the photoresist layer 15A having rectangular shape, into a concave shape, and thereby form lens layer 15 of FIG. 3H. The photoresist layer functions as a concave lens for dispersing the light beam which is transmitted through the substrate.

Preferably, the concave lens layer 15 is about 5% to about 20% wider than the width of the light shielding layer 12. This leads to an increase the optical visual angle θ of about 5° to about 40°, as compared to a conventional LCD device.

Accordingly, color filters and methods of the invention can improve the aperture ratio without requiring reduction in the width of the light shielding layer. Moreover, highly accurate alignment need not be required for the color filter layer relative to the light shielding layer. High resolution images can be displayed with wide optical viewing angles.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of fabricating a color filter for a liquid crystal display device comprising the steps of:

forming a light shielding layer including an array of first apertures therein on a front face of a transparent substrate;

forming a light dispersing layer on the rear face of the transparent substrate;

patterning the light dispersing layer through the transparent substrate using the light shielding layer as a mask, to form a patterned light dispersing layer having second apertures therein opposite the first apertures in the light shielding layer; and flowing the patterned light dispersing layer to form a lens layer opposite the light shielding layer and which extends on the rear surface at least partially to opposite the array of first apertures.

2. A method according to claim 1 wherein the step of forming a light shielding layer is followed by the step of:

forming a color filter layer on the light shielding layer, the color filter layer spanning the first apertures.

3. A method according to claim 2 wherein the step of forming a color filter layer comprises the step of:

forming a color filter layer on the light shielding layer and filling the first apertures.

4. A method according to claim 2 wherein the steps of patterning the light dispersing layer and forming a color filter layer are performed simultaneously.

5. A method according to claim 1 wherein the step of forming a light dispersing layer is followed by the step of forming a reflecting layer on the light dispersing layer, and wherein the step of flowing the patterned light dispersing layer is preceded by the step of removing the reflecting layer.

6. A method according to claim 1 wherein the step of forming a light shielding layer comprises the steps of:

forming a light shielding layer on the front face of the transparent substrate; and patterning the light shielding layer.

7. A method according to claim 1 wherein the step of forming a light dispersing layer comprises the step of:

forming a photoresist layer on the rear face of the transparent substrate.

* * * * *

UNITED STATES PATENT AND TRADEMARK OFFICE
CERTIFICATE OF CORRECTION

PATENT NO.   : 6,323,920 B1                                                Page 1 of 1
DATED        : November 27, 2001
INVENTOR(S)  : Kim It is certified that error appears in the above-identified patent and that said Letters Patent is hereby corrected as shown below:

<u>Title page,</u>
Item [62], "Related U.S. Application Data" should read as follows:
-- Division of application No. 08/772,457, filed on Dec. 23, 1996, now Pat. No. 6,078,372. --

<u>Column 1,</u>
Line 4, should read as follows: -- division of Ser. No. 08/772,457 --

Signed and Sealed this

Third Day of September, 2002

*Attest:*

*Attesting Officer*

JAMES E. ROGAN
*Director of the United States Patent and Trademark Office*